(12) United States Patent
Liu et al.

(10) Patent No.: US 12,425,356 B1
(45) Date of Patent: Sep. 23, 2025

(54) RECONFIGURABLE PROCESSOR-BASED PROGRAMMABLE SWITCHING FABRIC AND PROGRAMMABLE DATA PLANE CHIP

(71) Applicant: TSINGHUA UNIVERSITY, Beijing (CN)

(72) Inventors: Bin Liu, Beijing (CN); Zhikang Chen, Beijing (CN); Yong Feng, Beijing (CN); Shuxin Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 19/257,520

(22) Filed: Jul. 2, 2025

Related U.S. Application Data (63) Continuation of application No. PCT/CN2024/108541, filed on Jul. 30, 2024.

(30) Foreign Application Priority Data

Jul. 11, 2024 (CN) .......................... 202410929824.0

(51) Int. Cl.
*H04L 49/00* (2022.01)
*H04L 49/60* (2022.01)

(52) U.S. Cl.
CPC ...... *H04L 49/3009* (2013.01); *H04L 49/3063* (2013.01); *H04L 49/602* (2013.01)

(58) Field of Classification Search
CPC ............. H04L 49/3009; H04L 49/3063; H04L 49/602
See application file for complete search history.

(56) References Cited

U.S. PATENT DOCUMENTS 7,757,033 B1 * 7/2010 Mehrotra ................ H04L 49/70
710/316
9,940,284 B1 * 4/2018 Davis .................. G06F 13/4221
(Continued)

FOREIGN PATENT DOCUMENTS

CA          2160200 A1    4/1996
CN      109302357 B  *  5/2020  ........... H04L 49/109
(Continued)

OTHER PUBLICATIONS

International Search Report dated Feb. 21, 2025 in International Application No. PCT/CN2024/108541. English translation attached.
(Continued)

*Primary Examiner* — Wutchung Chu (57) ABSTRACT

The present disclosure relates to the technical field of programmable data planes, and more particularly, to a reconfigurable processor-based programmable switching fabric and a programmable data plane chip. The fabric includes a first side pathway configured to transmit a Packet Header Vector (PHV); a second side pathway configured to transmit data other than the PHV and a control signal; and a reconfigurable processor sequence comprising a plurality of reconfigurable processors in communication with each other via the first side pathway and the second side pathway. Each reconfigurable processor is reconfigurable as a pipeline stage or a Run-to-Complete (RTC) processor. A data pathway for transmitting the PHV is provided each pair of adjacent reconfigurable processors. Different connection operations are performed based on the reconfigurable processors at two ends of the data pathway.

18 Claims, 5 Drawing Sheets

(56) References Cited

U.S. PATENT DOCUMENTS

| | | | |
|---|---|---|---|
| 11,245,778 B1 | 2/2022 | Bosshart | |
| 11,394,663 B1* | 7/2022 | K N | H04L 47/6255 |
| 11,706,159 B2* | 7/2023 | Zhang | H04L 45/033 |
| | | | 709/223 |
| 2004/0078419 A1* | 4/2004 | Ferrari | H04L 67/1017 |
| | | | 709/201 |
| 2004/0078467 A1* | 4/2004 | Grosner | G06F 16/10 |
| | | | 707/999.01 |
| 2004/0117438 A1* | 6/2004 | Considine | G06F 11/2074 |
| | | | 711/118 |
| 2004/0133634 A1* | 7/2004 | Luke | H04L 69/165 |
| | | | 709/203 |
| 2005/0021874 A1* | 1/2005 | Georgiou | G06F 15/167 |
| | | | 709/250 |
| 2014/0286352 A1* | 9/2014 | Turgeman | H04L 45/00 |
| | | | 370/428 |
| 2014/0358886 A1* | 12/2014 | Westlund | G06F 16/9535 |
| | | | 707/708 |
| 2015/0281125 A1* | 10/2015 | Koponen | G06F 12/0811 |
| | | | 711/122 |
| 2015/0370562 A1 | 12/2015 | Stark et al. | |
| 2016/0226763 A1* | 8/2016 | Zhang | H04L 41/0654 |
| 2016/0226822 A1* | 8/2016 | Zhang | H04L 41/0654 |
| 2017/0111275 A1* | 4/2017 | Li | H04L 69/22 |
| 2019/0238469 A1* | 8/2019 | Mizrahi | H04L 47/2441 |
| 2020/0097269 A1* | 3/2020 | Wang | G06F 8/41 |
| 2022/0164237 A1 | 5/2022 | King et al. | |
| 2023/0198912 A1* | 6/2023 | Mcdonnell | H04L 63/1466 |
| | | | 370/230 |
| 2023/0362105 A1* | 11/2023 | Zhang | H04L 69/329 |
| 2024/0192935 A1* | 6/2024 | Prabhakar | G06F 9/3897 |

FOREIGN PATENT DOCUMENTS

| | | | | |
|---|---|---|---|---|
| CN | 112585915 A | | 3/2021 | |
| CN | 116303225 A | | 6/2023 | |
| CN | 117880395 A | * | 4/2024 | H04L 49/10 |
| CN | 118259887 A | | 6/2024 | |
| CN | 119071255 A | * | 12/2024 | H04L 49/3063 |
| TW | 202127270 A | * | 7/2021 | G06N 3/063 |

OTHER PUBLICATIONS

First Office Action from corresponding Chinese Application No. 202410929824.0, dated Apr. 29, 2025. English translation attached.

The Grant Notice from corresponding Chinese Application No. 202410929824.0, dated May 22, 2025. English translation attached.

* cited by examiner

RECONFIGURABLE PROCESSOR-BASED PROGRAMMABLE SWITCHING FABRIC AND PROGRAMMABLE DATA PLANE CHIP

CROSS-REFERENCE TO RELATED APPLICATION

This application is a continuation of International Application No. PCT/CN2024/108541, titled "RECONFIGURABLE PROCESSOR-BASED PROGRAMMABLE SWITCHING FABRIC AND PROGRAMMABLE DATA PLANE CHIP", filed on Jul. 30, 2024, which is based on and claims priority to Chinese Patent Application No. 202410929824.0, filed on Jul. 11, 2024, both of which are incorporated herein by reference in their entireties.

FIELD

The present disclosure relates to the technical field of programmable data planes, and more particularly, to a reconfigurable processor-based programmable switching fabric and a programmable data plane chip.

BACKGROUND

Software-Defined Networking (SDN) includes a data plane and a control plane. The data plane is responsible for protocol parsing and deparsing, and packet processing. The control plane is responsible for issuing parsing rules and lookup table matching rules. From customized protocol forwarding to supporting in-network computing applications, high-performance programmable switching chips further tap into the potential of data plane devices. Architectures of the programmable switching chips can be classified into three types: pipeline, Run-To-Complete (RTC), and a converged architecture of the pipeline and RTC.

Programmable switching chips adopting the pipeline architecture typically have relatively high throughput and relatively low processing latency, but come with disadvantages as follows.
  1. There are limited calculation steps that can be performed at each pipeline stage.
  2. There is no efficient mechanism to pass data to an early stage due to unidirectionality of the pipeline.

In response to the above disadvantages, if a packet processing workflow meets any of the following conditions: containing a large number of computational requirements, having a long processing flow that cannot be parallelized due to dependencies, or needing to write state data back to the early stage, the pipeline architecture needs to recirculate a packet (i.e., the packet that has left the pipeline is resent to the head of the pipeline for processing again). Recirculation causes significantly increased latency of the recirculated packet, reduced system throughput, and multiple occupancies of pipeline processing capacity by the recirculated packet, leading to correspondingly decreased processing capacity for background traffic other than recirculated traffic, a potential possibility of out-of-order packets, and the destruction of strong state consistency in stateful applications.

If the recirculation is not used, there are typically three solutions as follows.
  1. Such tasks are submitted to the control plane for processing.
  2. A packet requiring such tasks is forwarded to a dedicated network function server for processing.
  3. A Field-Programmable Gate Array (FPGA) or other dedicated hardware is externally connected to the switching chip for processing.

All the three solutions above have significantly increased costs and still cannot solve the significantly increased latency of the recirculated packet, the potential possibility of out-of-order packets, and the destruction of the strong state consistency in stateful applications, as described above.

The RTC processor can process one packet continuously until the entire processing flow is completed, and can perform a relatively long and complex processing flow without forwarding the packet to other hardware modules. However, the RTC processor also faces problems such as the insufficient throughput, the relatively high latency, and the difficulty in guaranteeing the state consistency.

SUMMARY

The present disclosure provides a reconfigurable processor-based programmable switching fabric and a programmable data plane chip to solve problems in the related technology of the programmable switching chip in terms of relatively limited programmability of its architecture, insufficient throughput, and relatively high latency in network communication.

According to an embodiment of a first aspect of the present disclosure, a reconfigurable processor-based programmable switching fabric is provided, including: a first side pathway configured to transmit a Packet Header Vector (PHV); a second side pathway configured to transmit data other than the PHV and a control signal; and a reconfigurable processor sequence including a plurality of reconfigurable processors, the plurality of reconfigurable processors being in communication with each other via the first side pathway and the second side pathway. Each of the plurality of reconfigurable processors is reconfigurable as a pipeline stage or an RTC processor. A data pathway for transmitting the PHV is provided between each pair of adjacent reconfigurable processors. The data pathway is opened when the reconfigurable processors at two ends of the data pathway are reconfigured as pipeline stages to connect the two pipeline stages to a complete pipeline. The data pathway is closed when the reconfigurable processors at two ends of the data pathway are not both reconfigured as the pipeline stages, and one of the reconfigurable processors reconfigured as the RTC processor is connected via the first side pathway.

In an embodiment, the reconfigurable processor includes a processor in which all of the following items are reconfigurable, a processor in which some of the following items are reconfigurable and the other items are absent, or a processor in which some of the following items are reconfigurable and the other items are not reconfigurable: a register array, a data memory, an instruction memory, an Arithmetic Logic Unit (ALU), a Stateful Arithmetic Logic Unit (SALU), and a matching module. In the pipeline stage, the register array is configured to store a packet header field, metadata, and an intermediate signal; and in the RTC processor, the register array is configured to serve as a register set specified by an instruction system. In the pipeline stage, the data memory is configured to store a lookup table and a state table, the lookup table being configured for lookup when a packet passes through, and the state table being configured for reading, modifying, and writing back a state when a packet passes through; and in the RTC processor, the data memory is configured to store a packet header field, metadata, a lookup table, a state table, and an intermediate signal. The data memory is further configured to store a data structure related to operating system maintenance when the RTC processor is equipped with an operating system. The instruction memory is configured to store an instruction in both the pipeline stage and the RTC processor. The ALU is configured to perform an arithmetic logic calculation in both the pipeline stage and the RTC processor. In the pipeline stage, the SALU is configured to read a state from the state table in the data memory and write back a calculation result to the state table after performing an arithmetic logic calculation; and in the RTC processor, the SALU is configured to read data from the data memory and write back a calculation result to the data memory after performing an arithmetic logic calculation. The matching module is configured to perform searching and matching in the lookup table in the data memory based on a given key, and return whether a matching table entry exists and a corresponding table entry content in both the pipeline stage and the RTC processor.

In an embodiment, when the reconfigurable processor is reconfigured as the pipeline stage, the PHV of a packet is received by a current reconfigurable processor and is written into the register array of the current reconfigurable processor; a part of fields are selected based on a key selection rule determined by a user program to form a key, which is sent to the matching module; the matching module performs searching and matching in the lookup table in the data memory based on the key, determines an action Identification (ID) for execution based on a matching table entry when the matching table entry exists, and determines a default action ID specified by a user program when no matching table entry exists; and an instruction is read from the instruction memory based on the action ID and is parsed by using a decoder, and the parsed instruction is dispatched to the ALU and the SALU, where the ALU reads a field involved in calculation from the register array or a parameter of the instruction, performs the calculation and writes back a calculation result into the register array; the SALU reads a field involved in calculation from the register array or a parameter of the instruction, and reads a state involved in the calculation from the state table in the data memory, performs the calculation and writes back a calculation result into the register array and/or the state table in the data memory. In a processing flow, the PHV of the packet is transferred among registers of the register array corresponding to different pipeline cycles, and the PHV is sent out of the current reconfigurable processor after processing is completed.

In an embodiment, when the reconfigurable processor is reconfigured as the RTC processor, the PHV of a packet is received by a current reconfigurable processor and is written into the data memory of the current reconfigurable processor, the current reconfigurable processor is notified to start executing a processing flow, the current reconfigurable processor reads an instruction to be executed from an instruction memory based on a program counter until a processing termination instruction is read, and each read instruction is parsed by a dedicated decoder and is dispatched to the ALU or the SALU. The ALU reads a field involved in calculation from the register array or a parameter of the instruction, performs the calculation and writes back a calculation result into the register array. The SALU reads a field involved in calculation from the register array or a parameter of the instruction and reads data involved in the calculation from the data memory, performs the calculation and writes back a calculation result into the register array and/or the data memory. The matching module is configured to be connected to or not connected to the current reconfigurable processor. When the matching module is connected to the current reconfigurable processor, the current reconfigurable processor supports matching instruction, data required by the instruction is extracted from the register array and submitted to the matching module, and the matching module writes back a matching result into the register array.

In an embodiment, the reconfigurable processor is reconfigurable as an RTC processor having a plurality of RTC cores, and a quantity of the RTC cores is determined based on parallelism of the pipeline stage when the reconfigurable processor is reconfigured as the pipeline stage.

In an embodiment, the reconfigurable processor-based programmable switching fabric further includes a parser, a payload buffer, a deparser, and a hardware load. The parser and the deparser are connected to the first side pathway. The payload buffer and the hardware load are connected to the second side pathway. The parser is connected to the payload buffer and is configured to parse a packet to obtain the PHV and a payload and send the payload to the payload buffer.

In an embodiment, the first side pathway includes a plurality of first-pathway nodes, and in the first side pathway, the PHV passes through a processing flow of the complete pipeline and is sent by a last reconfigurable processor in the pipeline reconfigured as the pipeline stage to a corresponding first-pathway node. The PHV not to be sent to the RTC processor for processing is transferred along a first path that starts from the first-pathway node corresponding to the last reconfigurable processor in the pipeline that is reconfigured as the pipeline stage, and directly reaches a first-pathway node corresponding to the deparser along the first side pathway. The PHV to be sent to the RTC processor for further processing is transmitted along a second path that starts from the first-pathway node corresponding to the last reconfigurable processor in the pipeline that is reconfigured as the pipeline stage, and passes through a first-pathway node corresponding to the RTC processor at which an RTC core assigned for processing the PHV is located along the first side pathway. The PHV is downloaded from the first-pathway node corresponding to the RTC processor to the RTC core assigned for the PHV for processing, and is uploaded to the first-pathway node corresponding to the RTC processor at which the RTC core that processes the PHV is located in an idle cycle of the first-pathway node.

In an embodiment, the first path and the second path have a common source node and a common sink node, where the source node is the first-pathway node corresponding to the last reconfigurable processor reconfigured as the pipeline stage, the sink node is a first-pathway node corresponding to the deparser, and a buffer is provided at the sink node for handling congestion. When the buffer meets an impending overflow condition, the buffer sends a notification signal to the reconfigurable processor reconfigured as the RTC processor, to cause the reconfigurable processor to stop uploading a new PHV to the second path.

In an embodiment, the second side pathway includes at least one second-pathway node, the second side pathway supports at least one of the following data transfer: sending a request from the reconfigurable processor reconfigured as the RTC processor, reading a payload of a packet processed by the reconfigurable processor reconfigured as the RTC processor from the payload buffer, and transferring the payload back to the reconfigurable processor reconfigured as the RTC processor, where the payload is stored in the data memory by the reconfigurable processor reconfigured as the RTC processor for subsequent processing; sending a request from the reconfigurable processor reconfigured as the RTC processor, reading data in the data memory or the register array of another reconfigurable processor, and transferring the read data back to the data memory of the reconfigurable processor reconfigured as the RTC processor; sending a request from the reconfigurable processor reconfigured as the RTC processor, and writing data into the data memory or the register array of another reconfigurable processor; and sending a request from the reconfigurable processor reconfigured as the RTC processor, and sending data to a hardware load, where the hardware load sends a processing result back to the reconfigurable processor reconfigured as the RTC processor.

According to an embodiment of a second aspect of the present disclosure, a programmable data plane chip is provided, including the reconfigurable processor-based programmable switching fabric according to any one of the above embodiments.

Thus, the present disclosure includes the following beneficial effects.

In the embodiments of the present disclosure, through the design of reconfiguring the reconfigurable processor into the pipeline stage or the RTC processor, programmability of a switch is significantly improved with only a small additional consumption of chip area, enabling network applications originally deployed on servers and middleboxes to be offloaded to the programmable switch. In this way, latency in network communication is reduced, performance of network services is improved, and requirements for servers and middlebox devices in a data center network as well as construction and maintenance cost of the data center network are lowered. Thus, problems in the related technology of the programmable switching chip in terms of relatively limited programmability of its architecture, insufficient throughput, and relatively high latency in the network communication are solved.

Additional aspects and advantages of the embodiments of the present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings.

DETAILED DESCRIPTION OF THE EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

A reconfigurable processor-based programmable switching fabric and a programmable data plane chip according to embodiments of the present disclosure will be described below with reference to the accompanying drawings. In response to the problems mentioned in the above background, the present disclosure provides the reconfigurable processor-based programmable switching fabric. Through reconfiguring a reconfigurable processor into a pipeline stage or an RTC processor, programmability of a switch is significantly improved with only a small additional consumption of chip area, enabling network applications originally deployed on a server and a middlebox to be offloaded to the programmable switch. In this way, latency in network communication is reduced, performance of a network service is improved, and requirements for the server and the middlebox device in a data center network as well as construction and maintenance cost of the data center network are lowered. Thus, problems in the related technology of the programmable switching chip in terms of relatively limited architectural programmability, insufficient throughput, and relatively high latency in the network communication are solved.

Before introducing the present disclosure, technologies related to the present disclosure are explained in detail as follows.

1. First Related Technology

Figure 1:
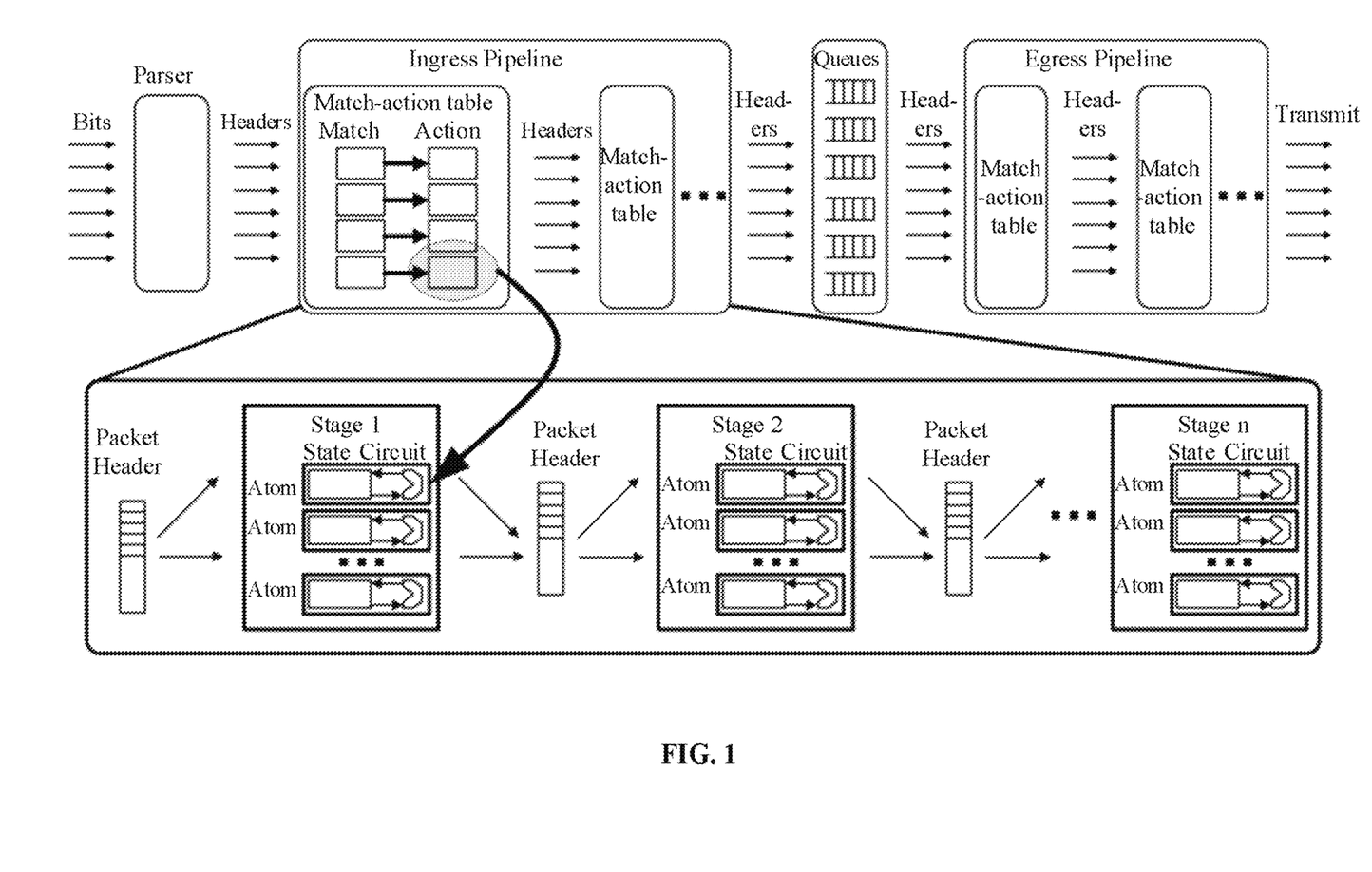
FIG. 1 is a schematic diagram of the Banzai architecture in the related technology.

As illustrated in FIG. 1, Banzai is a technical prototype of programmable switch Tofino launched by Intel. When a packet enters Banzai, Banzai parses out a header field of the packet through a programmable parser and processes the header through two pipelines including an ingress pipeline and an egress pipeline. The two pipelines with a same structure constitute a programmable packet processing logic of Banzai. Each of the two pipelines is composed of a series of stages, namely, Match-Action Units (MAUs), which are basic programmable units of this prototype. A user programs an MAU through P4 programs in two aspects: what lookup table should be queried for the packet at this stage, and what processing logic should be executed after the query result is obtained. A processing logic for each stage in Banzai is performed using a set of parallel atomic actions, and each of the atomic actions can perform a "read-add/subtract-writeback" function.

A programmable switching chip adopting the pipeline architecture tends to have relatively high throughput and low latency, but the pipeline encounters difficulties when processing network tasks as follows. (1) A large quantity of computational requirements. Since the processing logic in each MAU is performed using a set of the parallel atomic actions, that is, only one cycle in each MAU actually performs calculations, if the packet processing flow contains a large quantity of calculations, there is a delay of the whole MAU between two calculations, which seriously affects packet processing latency. When a computational load reaches a certain level, the number of the calculations provided by the pipeline length is not enough to accommodate the complete calculation. Therefore, recirculation is required, resulting in a significant attenuation of throughput. (2) Complex stateful function. Due to simplicity of the atomic action, only a simple stateful function (such as a counter) can be achieved through the atomic action. For a relatively complex function, a logic to determine a next state may involve a series of actions and table access, which cannot be achieved through the atomic action. In order to avoid a bottleneck in the pipeline, this solution cannot support these stateful functions by simply expanding the atomic action circuit and enhancing the function of the atomic action. Due to unidirectionality of the pipeline, there is no effective mechanism to write state data back to an early stage. The only way is recirculation, causing the significant attenuation of the throughput. (3) Long dependency chain between instructions. Since the processing logic in each MAU is performed using a set of the parallel atomic actions, if one instruction in the packet processing flow needs to use a calculation result of another instruction (i.e., depending on this instruction), the two instructions cannot be executed in parallel and must be laid out in different MAUs. When a length of the dependency chain between the instructions reaches N, N different MAUs are needed to perform this processing flow, even though a large number of storage and computational resources in these N MAUs are wasted, which causes serious resource waste. For a relatively complex packet processing flow (such as a network service chain), the length of the pipeline (i.e., the number of MAUs) is typically not enough to layout the complete flow. Therefore, recirculation of the packet is required, resulting in the significant attenuation of the throughput.

2. Second Related Technology

Figure 2:
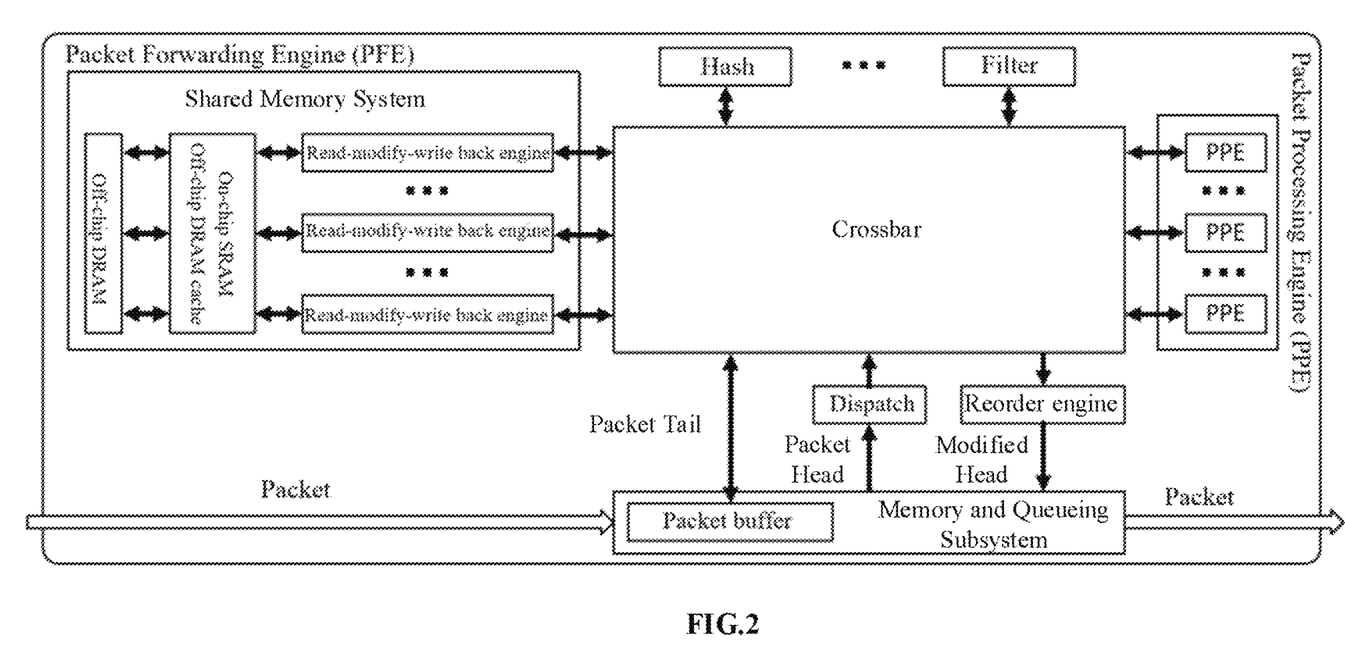
FIG. 2 is a schematic diagram of the Trio architecture in the related technology.

Trio is a technical prototype of an MX series programmable router launched by Juniper. Trio processes a packet through units of Packet Forwarding Engines (PFEs), and a PFE can be integrated into a chip. In order to extend processing capability of the router, multiple PFEs need to be connected through a switching network. A structure of the PFE is illustrated in FIG. 2, which contains hundreds of Packet Processing Engines (PPEs). After a packet enters the PFE, the payload of the packet is stored in a buffer, and a head is dispatched to a target PPE via a dispatcher through the crossbar. Each PPE is an RTC processor that can access a shared memory system including a Static Random Access Memory (SRAM) cache and an off-chip Dynamic Random Access Memory (DRAM), a hardware acceleration module such as a hash and a filter, as well as the buffer that stores the payload, via the crossbar. After the packet head is processed in PPE, the packet head is passed through a reorder engine to ensure that the sending order of the packet is the same as the arrival order of the packet, and is then assembled with the payload in the buffer and sent out.

Because the PPE is the RTC processor, a packet can be continuously processed until the entire processing flow is completed, so Trio can perform a relatively long and complex processing flow without being limited by the length of the pipeline. But Trio also faces challenges as follows. (1) Insufficient throughput. Due to limitations of a size and power of the chip, a single PFE chip can support a rather limited network throughput, approximately 1 to 2 orders of magnitude lower than that of the programmable switching chip with the pipeline architecture. (2) High latency. When the PPE accesses the memory (e.g., looking up a lookup table and a state table), it needs to access a shared storage system via the fully connected network. Latency of a single memory access is approximately 1 to 2 orders of magnitude higher than that of the programmable switching chip with the pipeline architecture that uses an MAU-exclusive memory. For a state table where a read-write conflict may occur, a synchronization mechanism such as locking further increases memory access latency. (3) Difficulty in guaranteeing state consistency. Since the throughput of each PPE is extremely low, when processing large-scale stateful flows, one flow may be dispatched to different PPEs, resulting in inconsistency in an order in which a packet of the flow is processed and an order in which the packet arrives. When an application requires strong state consistency or relatively strict bounded staleness consistency, the state consistency is corrupted.

3. Third Related Technology

Figure 3:
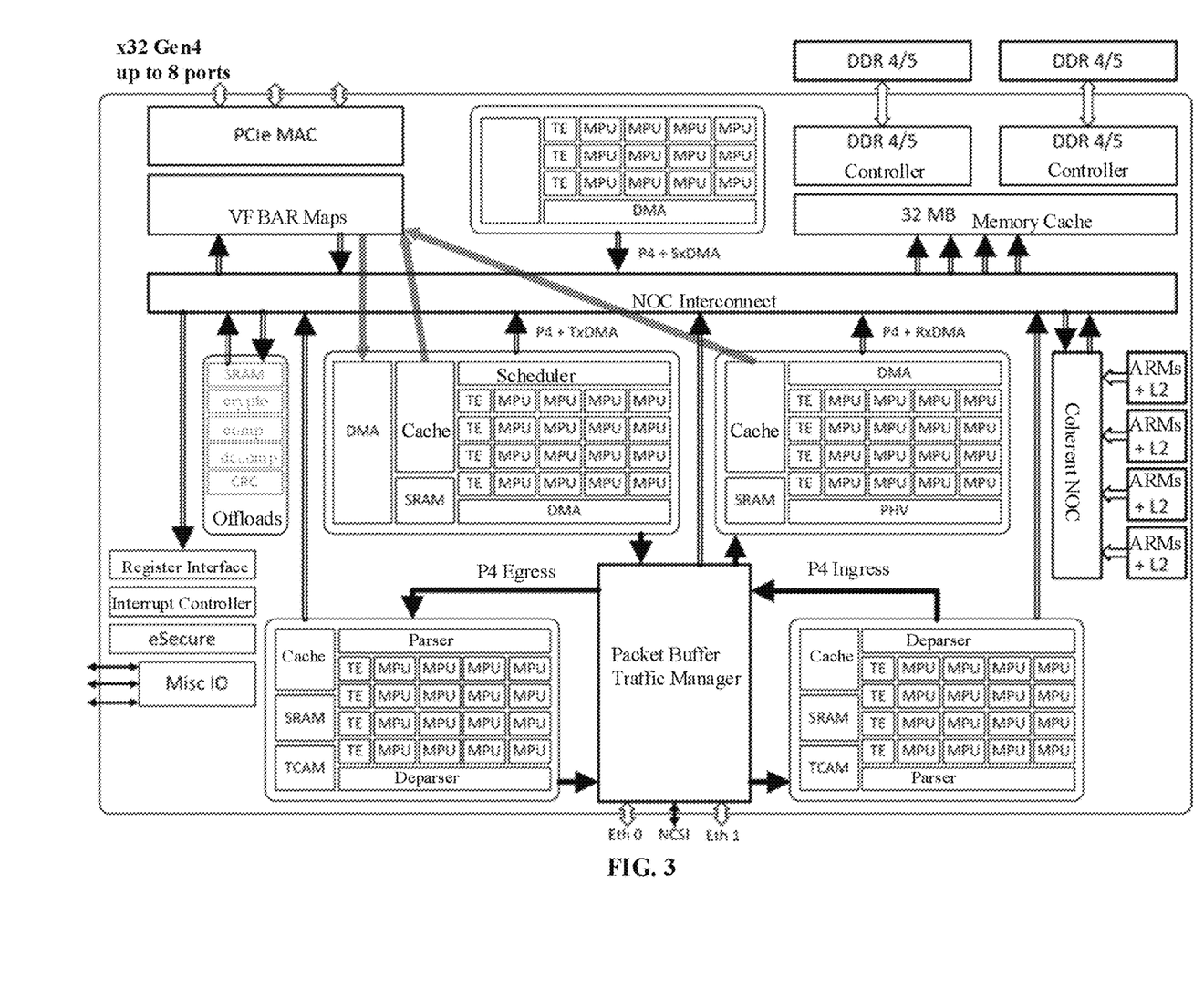
FIG. 3 is a schematic diagram of the Sirius architecture in the related technology.

Sirius is a technical prototype of Pensando Data Processing Unit (DPU) launched by AMD. An architecture of Sirius is shown in FIG. 3, which includes 2 ordinary pipelines and 3 dedicated pipelines for Direct Memory Access (DMA). Each pipeline in Sirius includes a Table Engine (TE) and several Match Process Units (MPUs). A function of the MPU is similar to that of the MAU in Banzai, but the MPU in Sirius does not include a memory and a corresponding memory access module. When the MPU needs to access the memory, the MPU accesses its shared storage system including an SRAM cache and an off-chip DRAM through the TE via a Network On Chip (NOC) interconnection network. The NOC interconnection network is also connected to a PCIe port leading to the server, hardware accelerators such as compression, encryption, and Cyclic Redundancy Check (CRC), and a set of embedded ARM cores. When the packet cannot complete the processing flow through the pipeline, it is sent to an ARM core operating in the RTC form via the NOC interconnect network.

By integrating the two architectures of pipeline and RTC, Sirius achieves separation of tasks with a simple processing flow and a complex processing flow. Simple tasks can be processed in high-performance forms through the pipelines, while complex tasks can be sent to the more programmable RTC core without being limited by the length of the pipeline. However, the existing converged architecture still has the following problems. (1) Inapplicability in switch scenarios. The existing converged architectures are all designed for smart network cards, DPUs, or Infrastructure Processing Units (IPUs). For example, AMD Pensando DSC2-200 has a designed bandwidth of only 400 Gbps, a throughput that cannot be used in the switch scenarios. (2) Inadequate scalability. In the converged architecture, the pipeline is typically connected to the RTC core via a fully-connected bus or a shared memory. These structures expand rapidly with a complexity of O(N2) as the number of access modules N increases, resulting in unacceptable chip area and power consumption. (3) Resource idleness. Due to the rapid development of SDN, manufacturers of network switching devices cannot accurately predict network services that will be deployed on their produced network switching devices in the future, and various network services have markedly different requirements for both the pipeline and the RTC core. Services that require relatively strict performance metrics such as the throughput and the latency may require a longer pipeline, while services with the complex processing flows may require more RTC cores. In order to meet user requirements in different scenarios, the manufacturers of the network switching devices of the converged architecture need to provide a pipeline of a maximum length and the maximum number of the RTC cores. However, when user services only require computational resources of one type, computational resources of another type are idle, thereby reducing effective utilization of the chip area.

Figure 4:
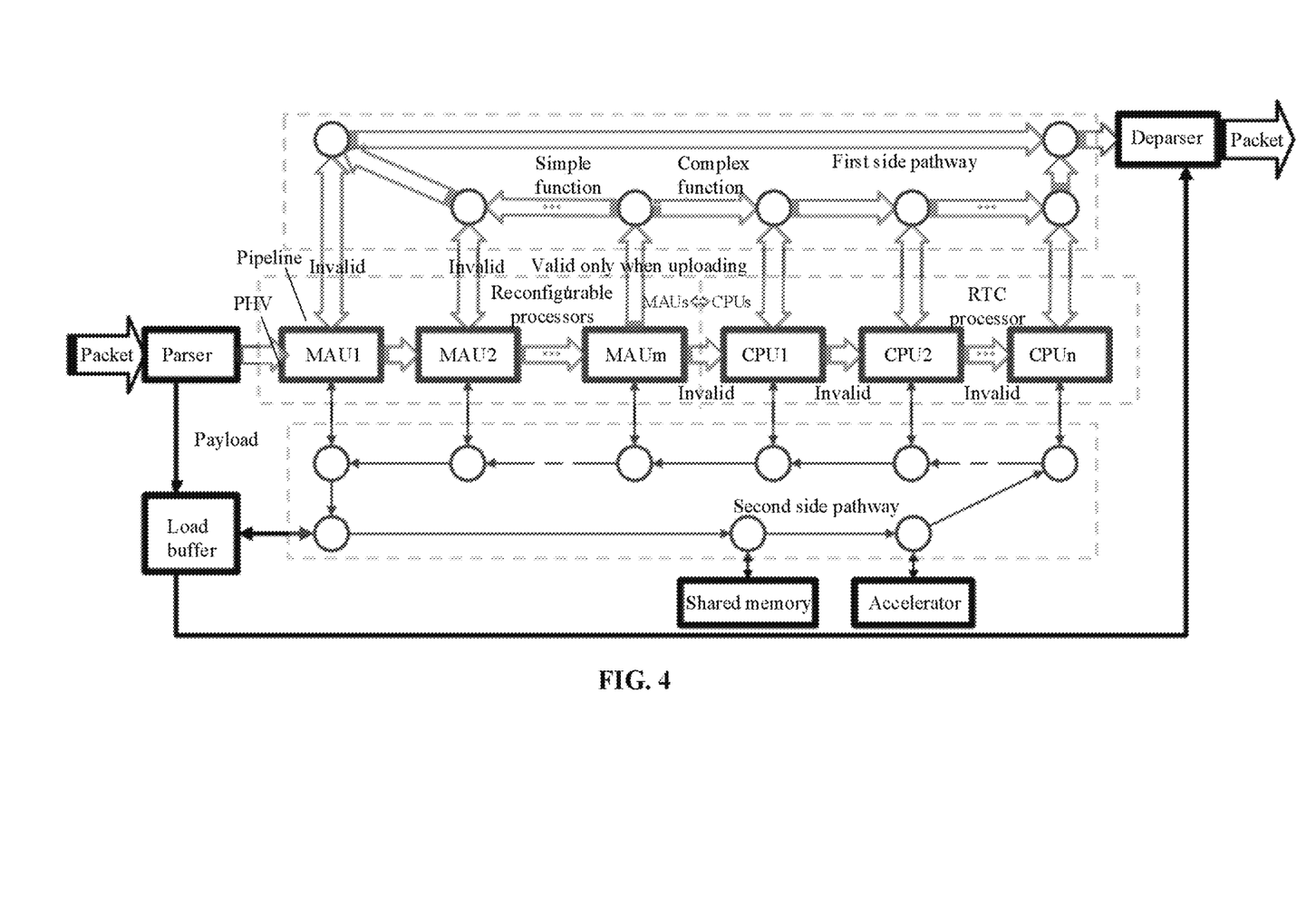
FIG. 4 is a block diagram of a reconfigurable processor-based programmable according to an embodiment of the present disclosure.

FIG. 4 is a block diagram of a reconfigurable processor-based programmable switching fabric according to an embodiment of the present disclosure.

As shown in FIG. 4, the reconfigurable processor-based programmable switching fabric includes a first side pathway, a second side pathway, and a reconfigurable processor sequence.

The first side pathway is configured to transmit a PHV. The PHV is a signal composed of a field of a packet header that needs to be processed and other metadata fields generated during packet processing, which are arranged in a predetermined order, and the PHV is typically 4,096 bits wide. The second side pathway is configured to transmit data other than the PHV and a control signal. The reconfigurable processor sequence includes a plurality of reconfigurable processors. The plurality of reconfigurable processors are in communication with each other via the first side pathway and the second side pathway. Each of the plurality of reconfigurable processors is reconfigurable as a pipeline stage or an RTC processor. RTC means that the entire processing flow of a packet runs on a single processor until the processing flow is completed without being sent to other processors, which corresponds to a flow where only one link is processed in each stage of the pipeline structure. A data pathway for transmitting the PHV exists between each pair of adjacent reconfigurable processors. The data pathway is opened when the reconfigurable processors at two ends of the data pathway are both reconfigured as pipeline stages to connect the two pipeline stages to a complete pipeline. The data pathway is closed when the reconfigurable processors at two ends of the data pathway are not both reconfigured as the pipeline stages, and one of the reconfigurable processors reconfigured as the RTC processor is connected via the first side pathway.

Figure 5:
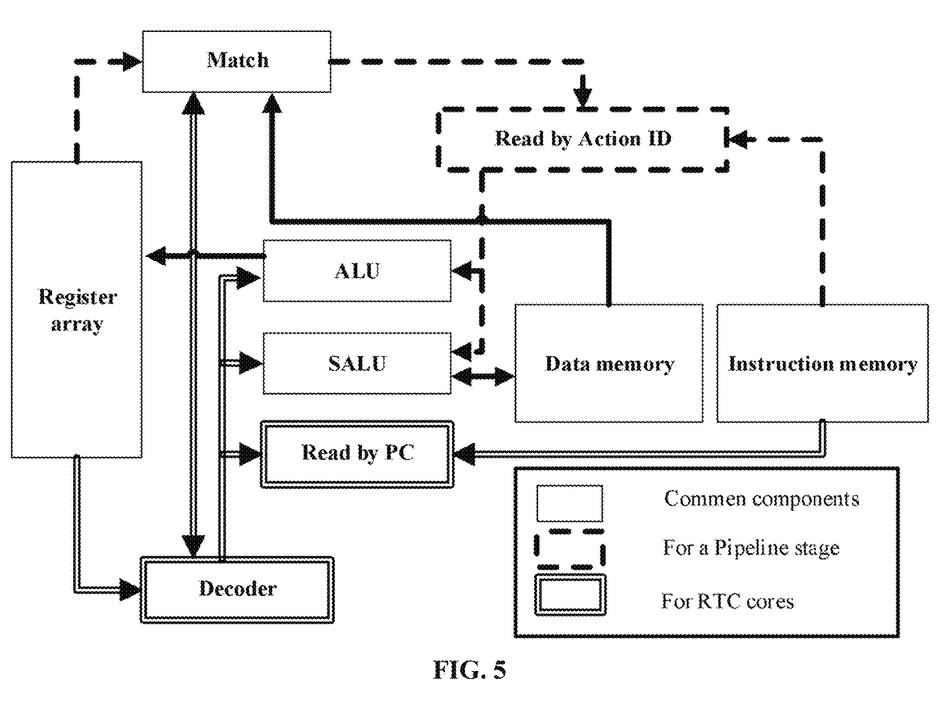
FIG. 5 is a diagram showing an exemplary composition structure and data pathway of a reconfigurable processor according to an embodiment of the present disclosure.

In an embodiment of the present disclosure, the reconfigurable processor may be reconfigured as a pipeline stage (e.g., an MAU) or an RTC processor based on a content of a configuration register issued by a compiler. A structure of the reconfigurable processor is shown in FIG. 5, which includes a series of hardware components and connections between the hardware components. When the reconfigurable processor is reconfigured as the pipeline stage or an RTC processor, components and connections between the components are enabled accordingly, thereby realizing reuse of hardware resources.

Further, in an embodiment of the present disclosure, the structure as shown in FIG. 4, which is adopted to connect the reconfigurable processors in series, includes a sequence of linearly arranged reconfigurable processors, a first side pathway configured to transmit a PHV, and a second side pathway configured to transmit data other than the PHV and a control signal.

After a packet passes through a parser, a parsed PHV enters a first reconfigurable processor in the reconfigurable processor sequence (if all the reconfigurable processors are reconfigured as the RTC processors, the packet enters a first-pathway node of the first side pathway), and remaining payloads are stored into a buffer SRAM. There are data pathways for transmitting the PHV between the reconfigurable processors. The data pathway is opened when the reconfigurable processors at two ends of the data pathway are both reconfigured as pipeline stages to connect the two pipeline stages to a complete pipeline. When the reconfigurable processors at two ends of the data pathway are not both reconfigured as the pipeline stages, the data pathway is closed, and no PHV is transmitted. Therefore, in the entire reconfigurable processor sequence, first reconfigurable processors of a certain number (which may be 0) are reconfigured as the pipeline stages and connected into a complete pipeline through the data pathways between the reconfigurable processors, and last reconfigurable processors of a certain number (which may be 0) are reconfigured as the RTC processors, where each of the RTC processors is relatively independent and connected only through the first side pathway.

It should be noted that in the embodiments of the present disclosure, parallelism of the reconfigurable processor when the reconfigurable processor is reconfigured as the pipeline stage determines the number of RTC cores when the reconfigurable processor is reconfigured as the RTC processor. The reconfigurable processor having a larger chip area has greater parallelism when serving as the pipeline stage (e.g., looks up more tables simultaneously), and has more cores when serving as the RTC processor. Thus, the embodiments of the disclosure have good scalability. When the manufacturer is willing to allocate more chip area and power consumption, performance (within limitations of hardware wiring capabilities) can be linearly improved. In addition, the side pathway includes but is not limited to a ring interconnection, unidirectional or bidirectional linear interconnections, and other interconnections with similar principles. The ring interconnection is shown in FIG. 4, and in the embodiment of the present disclosure, the side pathway manifested as the ring interconnection will be described as an example.

In an embodiment of the present disclosure, the reconfigurable processor includes a processor in which all of the following items are reconfigurable, a processor in which some of the following items are reconfigurable and the other items are absent, or a processor in which some of the following items are reconfigurable and the other items are not reconfigurable, including: a register array, a data memory, an instruction memory, an ALU, an SALU, and a matching module. Each reconfigurable processor is reconfigurable as a pipeline stage or an RTC processor. Components reusable between the pipeline stage and the RTC processor in an embodiment of the present disclosure are as follows.

1) The register array. In the pipeline stage, the register array is configured to store a packet header field, metadata, and an intermediate signal used in a processing flow, which are required to be stored in the register array rather than in a RAM to avoid pipeline blocking. In the RTC processor, the register array is configured to store general and dedicated register sets.

2) The data memory. In the pipeline stage, the data memory is configured to store a lookup table for searching when a packet passes through and perform a corresponding operation based on a search result, and is further configured to store a state table for reading, modifying, and writing back a state when a packet passes through. In the RTC processor, the data memory is configured to store a packet header field, metadata, a lookup table, a state table, and an intermediate signal used in a processing flow. If the RTC processor is equipped with an operating system, the data memory is further configured to store a data structure such as a stack maintained by the operating system.

3) The instruction memory. The instruction memory is configured to store an instruction in both the pipeline stage and the RTC processor, in respective formats.

4) The ALU. The ALU is configured to perform an arithmetic logic calculation in both the pipeline stage and the RTC processor.

5) The SALU. In the pipeline stage, the SALU is configured to read a state from the state table in the data memory and write back a calculation result to the state table after performing the arithmetic logic calculation. In the RTC processor, the SALU is configured to read data from the data memory (not limited to the state table), and write back a calculation result to the data memory after performing the arithmetic logic calculation.
6) The matching module. The matching module is configured to perform searching and matching in the lookup table in the data memory based on a given key, and return whether a matching table entry exists and a corresponding table entry content in both the pipeline stage and the RTC processor.

It should be noted that in order to realize the reconfigurable processor, the multiple hardware components are reused in the embodiments of the present disclosure. Reconfigurability is achieved by reusing any of the hardware components, and is not limited to reusing each of the reusable components mentioned in the embodiments of the present disclosure.

In an embodiment of the present disclosure, when the reconfigurable processor is reconfigured as the pipeline stage, a parsed packet header and a field such as metadata (i.e., the PHV) carried by the packet header are received by a current reconfigurable processor and are written into the register array of the current reconfigurable processor. A part of fields are selected based on a key selection rule determined by a user program to form a key, which is sent to the matching module. The matching module performs searching and matching in the lookup table of the data memory based on the key. An action ID for execution is determined based on a matching table entry when the matching table entry exists; a default action ID determined by the user program is used when no matching table entry exists. An instruction is read from the instruction memory based on the action ID and is parsed by using a decoder, and the parsed instruction is dispatched to the ALU and the SALU. The ALU reads a field involved in calculation from the register array or a parameter of the instruction, performs the calculation and writes back a calculation result into the register array. The SALU reads a field involved in calculation from the register array or a parameter of the instruction, and reads a state involved in the calculation from the state table in the data memory, performs the calculation and writes back a calculation result into the register array and/or the state table in the data memory.

In the entire processing flow mentioned above, the PHV of the packet is transferred among registers of the register array corresponding to different pipeline cycles to achieve an uninterrupted pipeline function. The PHV is sent out of the current reconfigurable processor after the processing is completed.

In an embodiment of the present disclosure, when the reconfigurable processor is reconfigured as the RTC processor, the PHV is received by a current reconfigurable processor and is written into a data memory of the current reconfigurable processor, and the current reconfigurable processor is notified to start executing a processing flow. The RTC processor continuously reads an instruction to be executed from the instruction memory based on a Program Counter (PC) until a processing termination instruction is read.

Each read instruction is parsed by a dedicated decoder and is dispatched to the ALU or SALU. The ALU reads a field involved in calculation from the register array or a parameter of the instruction, performs the calculation and writes back a calculation result into the register array. The SALU reads a field involved in calculation from the register array or a parameter of the instruction and reads data involved in the calculation from the data memory, performs the calculation and writes back a calculation result into the register array and/or data memory. A content of the PC is changed by a branch jump instruction in the instructions.

The RTC processor may write an extracted key code into the register array and submit the key code to the matching module through a predetermined instruction, and the matching module operates as a coprocessor and writes back a result into the register array. The PHV is sent out of the current reconfigurable processor after the processing termination instruction is read.

It should be noted that one reconfigurable processor may be reconfigured as a plurality of RTC cores, and a quantity of convertible RTC cores is determined by parallelism of the pipeline stage. In the pipeline stage, an instruction may be given in the form of Very Long Instruction Word (VLIW) and is parsed and dispatched to a plurality of ALUs or a plurality of SALUs for parallel execution. Meanwhile, a plurality of memory access channels and a plurality of functional accelerators (such as hashing, typically integrated into the matching module) are provided in the pipeline stage. Therefore, a plurality of sets of parallel functional components can be assigned to different cores in the RTC processor. Thus, the pipeline stage is reconfigured as the plurality of RTC cores.

The RTC processor does not participate in receiving and sending the PHV and may process other PHVs while the PHV is received or sent. Each RTC core includes a PHV buffer for temporarily storing PHVs that are received but not yet processed, as well as PHVs that have been processed but not yet sent.

It should be noted that the above components are parts of the reconfigurable processor that functions when the reconfigurable processor is reconfigured as the pipeline stage and the RTC processor, rather than all parts of the reconfigurable processor. The reconfigurable processor further includes:
1) an instruction decoder dedicated to the pipeline stage and an instruction decoder dedicated to the RTC processor;
2) a configuration register dedicated to the pipeline stage and a configuration register dedicated to the RTC processor, as well as other registers (including the PC);
3) a circuit that connects all the above modules in a required manner; and
4) for a configuration register to configure the above circuit, based on a state of the configuration register, part of the circuit is connected to the switching fabric and another part is disconnected, and the part of the circuit connected to the switching fabric allows the reconfigurable processor to be connected to the entire switching fabric as the pipeline stage or the RTC processor.

Further, the reconfigurable processor-based programmable switching fabric further includes a parser, a payload buffer, a deparser, and a hardware load.

The parser, the deparser, and each reconfigurable processor are connected to the first side pathway and each have a corresponding first-pathway node. The first side pathway includes a plurality of first-pathway nodes. The PHV passes through a processing flow of the complete pipeline and is sent to a corresponding one of the plurality of first-pathway nodes by a last reconfigurable processor reconfigured as the pipeline stage in the pipeline. The first-pathway node determines, based on a dedicated field in the PHV, whether the PHV is to be sent to the RTC processor for further processing and which RTC processor the PHV is to be sent to for further processing.

For the PHV that does not need to be sent to the RTC processor for processing, the PHV is transferred from the first-pathway node corresponding to the last reconfigurable processor in the pipeline that is reconfigured as the pipeline stage, and directly to a first-pathway node corresponding to the deparser along the first side pathway, which is referred to as a first path.

For the PHV that needs to be sent to the RTC processor for further processing, the PHV is transferred from the first-pathway node corresponding to the last reconfigurable processor in the pipeline that is reconfigured as the pipeline stage, to a corresponding RTC processor along the first side pathway. The PHV is downloaded to the RTC core assigned for the PHV for processing. After the processing is completed, the PHV is sent to a first-pathway node corresponding to the RTC processor in an idle cycle of the first-pathway node, and further transferred to a first-pathway node corresponding to the deparser. This is referred to as a second path.

Further, in an embodiment of the disclosure, the first path and the second path have a common source node and a common sink node. The source node is the first-pathway node corresponding to the last reconfigurable processor reconfigured as the pipeline stage. The sink node is the first-pathway node corresponding to the deparser. Other nodes are not shared by the first path and the second path to ensure that a packet passing through the first path that does not require complex processing can be processed with low latency. When the reconfigurable processor is reconfigured as an RTC processor that includes more than one core, a scheduling module is included at the first-pathway node corresponding to each reconfigurable processor, and the PHV sent to the first-pathway node by each RTC core on the reconfigurable processor is scheduled by a Round-Robin method.

In addition, the first path and the second path in an embodiment of the present disclosure have the common sink node, i.e., the first-pathway node corresponding to the deparser. A buffer is provided at the sink node for handling temporary congestion. When the buffer is about to overflow, the buffer sends a signal to the reconfigurable processor reconfigured as the RTC processor, to cause the RTC processor to stop uploading PHV to the second path. This mechanism enables the data memory for storing the PHV in all the RTC processors to be used as the buffer for handling congestion of the sink node. A packet entering the buffer indicates that the first path is idle within a cycle, and a packet of the second path may be scheduled, to ensure that the number of packets on the second path does not increase when this mechanism is triggered. As a result, the congestion at the sink can be solved without packet loss.

In an embodiment of the present disclosure, each reconfigurable processor, the payload buffer, and other hardware loads (e.g., a shared memory and an accelerator, etc.) are connected to the second side pathway and have corresponding second-pathway nodes. The second side pathway includes at least one second-pathway node and is configured to transfer a control signal and data. The second side pathway may support at least one of the following data transfer.

1) A request is sent from the reconfigurable processor reconfigured as the RTC processor, a payload of a packet processed by the reconfigurable processor reconfigured as the RTC processor is read from the payload buffer, and the payload is transferred back to the reconfigurable processor reconfigured as the RTC processor, for performing Deep Packet Inspection (DPI). The payload is stored in the data memory by the reconfigurable processor reconfigured as the RTC processor for subsequent processing.

2) A request is sent from the reconfigurable processor reconfigured as the RTC processor, data in the data memory or the register array of another reconfigurable processor is read, and the read data is transferred back to the data memory of the reconfigurable processor reconfigured as the RTC processor that sends the read request.

3) A request is sent from the reconfigurable processor reconfigured as the RTC processor, and data is written into the data memory or the register array of another reconfigurable processor.

4) A request is sent from the reconfigurable processor reconfigured as the RTC processor, and data is sent to a hardware load. The hardware load sends a processing result back to the reconfigurable processor reconfigured as the RTC processor.

Hereinafter, in-network computing applications that cannot be supported by an existing chip, but can be supported by the present disclosure are taken as examples for description in the embodiments of the present disclosure, which include the following application scenarios.

A First Application Scenario (In-Network Aggregation)

As large model technologies excel in various artificial intelligence application scenarios, distributed neural networks are widely deployed in data center networks. Computing nodes in the network need to conduct a large number of communications to synchronize training parameters, and one important operation is to aggregate gradients calculated by respective computing nodes. The conventional approach is to use servers for aggregation, which causes a relatively heavy communication burden on a server network interface, thereby reducing a convergence speed of the entire neural network training. ATP has proposed a solution to perform the in-network aggregation on a programmable switch. However, this solution has a limited in-network aggregation capability on the programmable switch due to the pipeline length of the current chip. Meanwhile, the current chip cannot achieve effective functional isolation when used for the in-network aggregation. The ability of the programmable switch to process the non-network aggregation traffic is significantly reduced during processing of the in-network aggregation traffic. Therefore, locally available bandwidth for other uses is limited, and overall service quality of cloud data center network is reduced. Using Trio can break the limitation of the pipeline length. However, the functional isolation still cannot be achieved, and the in-network aggregation traffic still significantly degrades overall performance of the switch. In the present disclosure, by sending the in-network aggregation traffic to the RTC core for processing, the limitation of the pipeline length on the aggregation capability can be broken through, and the in-network aggregation traffic is effectively isolated from other traffic processed on the pipeline.

A Second Application Scenario (In-Network Caching)

In-network caching technology is highly effective for accelerating query of a cache of a server. By caching some of server query results on the switch, if a newly arrived query packet hits the cache, the query result in the cache is directly returned without forwarding the query packet to the server for the querying; if the cache misses, when a query result returned by the server passes through the switch, the query result is written into the cache to replace an outdated table entry. NetCache uses a controller to handle the cache replacement function, leading to a performance bottleneck. P4LRU implements a Least Recently Used (LRU) cache replacement function on the pipeline. However, due to limitations of the programmability of the pipeline of the existing chip, each LRU group can only support three table entries. As a result, when data locality is not particularly good, a hit rate of this method has a larger gap compared with that of an ideal LRU. Meanwhile, in the related technology, a memory resource on the pipeline cannot be fully utilized to store the entry of the in-network cache. Therefore, the in-network cache cannot fully unleash potential of the memory on the switch. In the present disclosure, the pipeline serves as a first-level cache, and a query is forwarded to the RTC core to search a second-level cache when the first-level cache misses. Leveraging the capability of the RTC core of maintaining a complex data structure, the second-level cache on each core can implement a better cache replacement algorithm. Meanwhile, the RTC core can utilize all available memory on the processor as the cache. Therefore, more entries of the in-network cache are stored on the switch under same scale of resources. Therefore, the hit rate of the in-network cache is significantly improved, further reducing a network load and a computing load on the server side.

A Third Application Scenario (Network Service Integration)

In a data center network and an edge network, a specialized middlebox and a specialized accelerator that support various network functions are generally deployed to enhance security, performance, etc., of the network. For example, a gateway switch requires Distributed Denial of Service (DDOS) detection and mitigation (e.g., SYN flood detection). Other basic network functions include server load balancing and network address translation. In addition, telemetry and measurement aimed at improving network visibility (e.g., heavy hitter detection and in-band network telemetry) are becoming indispensable for improving efficiency and ensuring service quality. Deploying multiple single-purpose middleboxes is not only costly but also complicates network configuration and management. Integrating certain network functions into a programmable data plane device is conducive to cost reduction. On the existing pipeline-based chip, a packet needs to be recirculated multiple times due to complexity of the network function, resulting in huge loss in the throughput and the latency. On the existing chip with the multi-core RTC architecture, the processing performance of the chip is also greatly reduced due to the complex network function. In the present disclosure, network services are allocated to the pipeline and the multi-core RTC processor, to achieve an effective combination of the pipeline and the multi-core RTC processor. Basic and commonly used functions applicable to all the traffic are processed by the pipeline, while complex functions applicable only to selected packets are processed by the RTC core. Due to the design of the reconfigurable processor of the present disclosure, even in absence of prior knowledge of distribution of applications and traffic, the allocation of the network service on the pipeline and the multi-core RTC processor can be changed through the reconfiguration to optimize overall processing performance of the reconfigurable processor.

In the reconfigurable processor-based programmable switching fabric according to the embodiments of the present disclosure, through the design of reconfiguring the reconfigurable processor into the pipeline stage or the RTC processor, the programmability of the switch is significantly improved with only small additional consumption of the chip area, enabling the network application originally deployed on the server and the middlebox to be offloaded to the programmable switch. In this way, the latency in network communication is reduced, the performance of the network service is improved, and requirements for the server and the middlebox device in the data center network as well as construction and maintenance cost of the data center network are lowered. Thus, the problems in the related technology of the programmable switching chip in terms of relatively limited programmability of its architecture, insufficient throughput, and relatively high latency in the network communication are solved.

An embodiment of the present disclosure further provides a programmable data plane chip. The programmable data plane chip includes the reconfigurable processor-based programmable switching fabric according to the above embodiments of the present disclosure.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or N embodiments or examples. In addition, different embodiments or examples and features of different embodiments or examples described in the specification may be combined by those skilled in the art without mutual contradiction.

In addition, the terms such as "first" and "second" are used herein for purposes of description and are not intended to indicate or imply relative importance, or to implicitly show the number of technical features indicated. Thus, the feature defined with "first" and "second" may explicitly or implicitly include one or more this feature. In the description of the present disclosure, "N" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations. Functions may be executed in a different order from the illustrated or discussed order, and may be executed, depending on functions involved, substantially in parallel with each or in a reverse order, which should be understood by those skilled in the art of the embodiments of the present disclosure.

It should be understood that each part of the present disclosure may be realized by the hardware, software, firmware or their combination. In the above embodiments, steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array, a field programmable gate array, etc.

It would be understood by those skilled in the art that all or a part of the steps carried by the method in the above-mentioned embodiments may be completed by relevant hardware instructed by a program. The program may be stored in a computer-readable storage medium. When the program is executed, one or a combination of the steps of the method in the above-mentioned embodiments may be implemented.

Although embodiments of the present disclosure have been shown and described above, it should be understood that the above embodiments are just explanatory, and should not be construed to limit the present disclosure. Those skilled in the art can make changes, modifications, substitutions, and variations to the above embodiments within the scope of this application.

What is claimed is:

1. A reconfigurable processor-based programmable switching fabric, comprising:
    a first side pathway configured to transmit a Packet Header Vector (PHV);
    a second side pathway configured to transmit data other than the PHV and a control signal; and
    a reconfigurable processor sequence comprising a plurality of reconfigurable processors, the plurality of reconfigurable processors being in communication with each other via the first side pathway and the second side pathway, wherein:
    each of the plurality of reconfigurable processors is reconfigurable as a pipeline stage or a Run-To-Complete (RTC) processor;
    a data pathway for transmitting the PHV is provided between each pair of adjacent reconfigurable processors;
    the data pathway is opened, when the reconfigurable processors at two ends of the data pathway are reconfigured as pipeline stages, to connect the two pipeline stages to a complete pipeline; and
    the data pathway is closed when the reconfigurable processors at two ends of the data pathway are not both reconfigured as the pipeline stages, and one of the reconfigurable processors reconfigured as the RTC processor is connected via the first side pathway.

2. The reconfigurable processor-based programmable switching fabric according to claim 1, wherein the reconfigurable processor comprises a processor in which all of the following items are reconfigurable, a processor in which some of the following items are reconfigurable and the other items are absent, or a processor in which some of the following items are reconfigurable and the other items are not reconfigurable:
    a register array, wherein in the pipeline stage, the register array is configured to store a packet header field, metadata, and an intermediate signal; and in the RTC processor, the register array is configured to serve as a register set specified by an instruction system;
    a data memory, wherein in the pipeline stage, the data memory is configured to store a lookup table and a state table, the lookup table being configured for lookup when a packet passes through, and the state table being configured for reading, modifying, and writing back a state when a packet passes through; and in the RTC processor, the data memory is configured to store a packet header field, metadata, a lookup table, a state table, and an intermediate signal, wherein the data memory is further configured to store a data structure related to operating system maintenance when the RTC processor is equipped with an operating system;
    an instruction memory configured to store an instruction in both the pipeline stage and the RTC processor;
    an Arithmetic Logic Unit (ALU) configured to perform an arithmetic logic calculation in both the pipeline stage and the RTC processor;
    a Stateful Arithmetic Logic Unit (SALU), wherein in the pipeline stage, the SALU is configured to read a state from the state table in the data memory and write back a calculation result to the state table after performing an arithmetic logic calculation; and in the RTC processor, the SALU is configured to read data from the data memory and write back a calculation result to the data memory after performing an arithmetic logic calculation; and
    a matching module configured to perform searching and matching in the lookup table in the data memory based on a given key, and return whether a matching table entry exists and a corresponding table entry content in both the pipeline stage and the RTC processor.

3. The reconfigurable processor-based programmable switching fabric according to claim 2, wherein when the reconfigurable processor is reconfigured as the pipeline stage:
    the PHV of a packet is received by a current reconfigurable processor and is written into the register array of the current reconfigurable processor; a part of fields are selected based on a key selection rule determined by a user program to form a key, which is sent to the matching module;
    the matching module performs searching and matching in the lookup table in the data memory based on the key, determines an action ID for execution based on a matching table entry when the matching table entry exists, and determines a default action ID specified by a user program when no matching table entry exists; and
    an instruction is read from the instruction memory based on the action ID and is parsed by using a decoder, and the parsed instruction is dispatched to the ALU and the SALU, wherein the ALU reads a field involved in calculation from the register array or a parameter of the instruction, performs the calculation and writes back a calculation result into the register array; the SALU reads a field involved in calculation from the register array or a parameter of the instruction, and reads a state involved in the calculation from the state table in the data memory, performs the calculation and writes back a calculation result into the register array and/or the state table in the data memory; wherein
    in a processing flow, the PHV of the packet is transferred among registers of the register array corresponding to different pipeline cycles, and the PHV is sent out of the current reconfigurable processor after processing is completed.

4. The reconfigurable processor-based programmable switching fabric according to claim 2, wherein when the reconfigurable processor is reconfigured as the RTC processor:
    the PHV of a packet is received by a current reconfigurable processor and is written into the data memory of the current reconfigurable processor, the current reconfigurable processor is notified to start executing a processing flow, the current reconfigurable processor reads an instruction to be executed from an instruction memory based on a program counter until a processing termination instruction is read; and each read instruction is parsed by a dedicated decoder and is dispatched to the ALU or the SALU, wherein the ALU reads a field involved in calculation from the register array or a parameter of the instruction, performs the calculation and writes back a calculation result into the register array; and the SALU reads a field involved in calculation from the register array or a parameter of the instruction and reads data involved in the calculation from the data memory, performs the calculation and writes back a calculation result into the register array and/or the data memory; wherein the matching module is connected to or not connected to the current reconfigurable processor, wherein when the matching module is connected to the current reconfigurable processor, the current reconfigurable processor supports matching instruction, data required by the instruction is extracted from the register array and submitted to the matching module, and the matching module writes back a matching result into the register array.

5. The reconfigurable processor-based programmable switching fabric according to claim 1, wherein the reconfigurable processor is reconfigurable as an RTC processor having a plurality of RTC cores, and a quantity of the RTC cores is determined based on parallelism of the pipeline stage when the reconfigurable processor is reconfigured as the pipeline stage.

6. The reconfigurable processor-based programmable switching fabric according to claim 1, further comprising: a parser, a payload buffer, a deparser, and a hardware load, wherein the parser and the deparser are connected to the first side pathway, the payload buffer and the hardware load are connected to the second side pathway, and the parser is connected to the payload buffer and is configured to parse a packet to obtain the PHV and a payload and send the payload to the payload buffer.

7. The reconfigurable processor-based programmable switching fabric according to claim 6, wherein the first side pathway comprises a plurality of first-pathway nodes, and in the first side pathway, the PHV passes through a processing flow of the complete pipeline and is sent by a last reconfigurable processor in the pipeline reconfigured as the pipeline stage to a corresponding first-pathway node, wherein:

the PHV not to be sent to the RTC processor for processing is transferred along a first path that starts from the first-pathway node corresponding to the last reconfigurable processor in the pipeline that is reconfigured as the pipeline stage, and directly reaches a first-pathway node corresponding to the deparser along the first side pathway;

the PHV to be sent to the RTC processor for further processing is transmitted along a second path that starts from the first-pathway node corresponding to the last reconfigurable processor in the pipeline that is reconfigured as the pipeline stage, and passes through a first-pathway node corresponding to the RTC processor at which an RTC core assigned for processing the PHV is located along the first side pathway, wherein the PHV is downloaded from the first-pathway node corresponding to the RTC processor to the RTC core assigned for the PHV for processing, and is uploaded to the first-pathway node corresponding to the RTC processor at which the RTC core that processes the PHV is located in an idle cycle of the first-pathway node.

8. The reconfigurable processor-based programmable switching fabric according to claim 7, wherein the first path and the second path have a common source node and a common sink node, wherein the source node is the first-pathway node corresponding to the last reconfigurable processor reconfigured as the pipeline stage, the sink node is a first-pathway node corresponding to the deparser, and a buffer is provided at the sink node for handling congestion, wherein when the buffer meets an impending overflow condition, the buffer sends a notification signal to the reconfigurable processor reconfigured as the RTC processor, to cause the reconfigurable processor to stop uploading a new PHV to the second path.

9. The reconfigurable processor-based programmable switching fabric according to claim 6, wherein the second side pathway comprises at least one second-pathway node, the second side pathway supports at least one of following data transfer:

sending a request from the reconfigurable processor reconfigured as the RTC processor, reading a payload of a packet processed by the reconfigurable processor reconfigured as the RTC processor from the payload buffer, and transferring the payload back to the reconfigurable processor reconfigured as the RTC processor, wherein the payload is stored in the data memory by the reconfigurable processor reconfigured as the RTC processor for subsequent processing;

sending a request from the reconfigurable processor reconfigured as the RTC processor, reading data in the data memory or the register array of another reconfigurable processor, and transferring the read data back to the data memory of the reconfigurable processor reconfigured as the RTC processor;

sending a request from the reconfigurable processor reconfigured as the RTC processor, and writing data into the data memory or the register array of another reconfigurable processor; and sending a request from the reconfigurable processor reconfigured as the RTC processor, and sending data to a hardware load, wherein the hardware load sends a processing result back to the reconfigurable processor reconfigured as the RTC processor.

10. A programmable data plane chip, comprising a reconfigurable processor-based programmable switching fabric, wherein the reconfigurable processor-based programmable switching fabric comprises:

a first side pathway configured to transmit a Packet Header Vector (PHV);

a second side pathway configured to transmit data other than the PHV and a control signal; and a reconfigurable processor sequence comprising a plurality of reconfigurable processors, the plurality of reconfigurable processors being in communication with each other via the first side pathway and the second side pathway, wherein:

each of the plurality of reconfigurable processors is reconfigurable as a pipeline stage or a Run-To-Complete (RTC) processor;

a data pathway for transmitting the PHV is provided between each pair of adjacent reconfigurable processors;

the data pathway is opened, when the reconfigurable processors at two ends of the data pathway are reconfigured as pipeline stages, to connect the two pipeline stages to a complete pipeline; and the data pathway is closed when the reconfigurable processors at two ends of the data pathway are not both reconfigured as the pipeline stages, and one of the reconfigurable processors reconfigured as the RTC processor is connected via the first side pathway.

11. The programmable data plane chip according to claim 10, wherein the reconfigurable processor comprises a processor in which all of the following items are reconfigurable, a processor in which some of the following items are reconfigurable and the other items are absent, or a processor in which some of the following items are reconfigurable and the other items are not reconfigurable:
   a register array, wherein in the pipeline stage, the register array is configured to store a packet header field, metadata, and an intermediate signal; and in the RTC processor, the register array is configured to serve as a register set specified by an instruction system;
   a data memory, wherein in the pipeline stage, the data memory is configured to store a lookup table and a state table, the lookup table being configured for lookup when a packet passes through, and the state table being configured for reading, modifying, and writing back a state when a packet passes through; and in the RTC processor, the data memory is configured to store a packet header field, metadata, a lookup table, a state table, and an intermediate signal, wherein the data memory is further configured to store a data structure related to operating system maintenance when the RTC processor is equipped with an operating system;
   an instruction memory configured to store an instruction in both the pipeline stage and the RTC processor;
   an Arithmetic Logic Unit (ALU) configured to perform an arithmetic logic calculation in both the pipeline stage and the RTC processor;
   a Stateful Arithmetic Logic Unit (SALU), wherein in the pipeline stage, the SALU is configured to read a state from the state table in the data memory and write back a calculation result to the state table after performing an arithmetic logic calculation; and in the RTC processor, the SALU is configured to read data from the data memory and write back a calculation result to the data memory after performing an arithmetic logic calculation; and
   a matching module configured to perform searching and matching in the lookup table in the data memory based on a given key, and return whether a matching table entry exists and a corresponding table entry content in both the pipeline stage and the RTC processor.

12. The programmable data plane chip according to claim 11, wherein when the reconfigurable processor is reconfigured as the pipeline stage:
   the PHV of a packet is received by a current reconfigurable processor and is written into the register array of the current reconfigurable processor; a part of fields are selected based on a key selection rule determined by a user program to form a key, which is sent to the matching module;
   the matching module performs searching and matching in the lookup table in the data memory based on the key, determines an action ID for execution based on a matching table entry when the matching table entry exists, and determines a default action ID specified by a user program when no matching table entry exists; and
   an instruction is read from the instruction memory based on the action ID and is parsed by using a decoder, and the parsed instruction is dispatched to the ALU and the SALU, wherein the ALU reads a field involved in calculation from the register array or a parameter of the instruction, performs the calculation and writes back a calculation result into the register array; the SALU reads a field involved in calculation from the register array or a parameter of the instruction, and reads a state involved in the calculation from the state table in the data memory, performs the calculation and writes back a calculation result into the register array and/or the state table in the data memory; wherein
   in a processing flow, the PHV of the packet is transferred among registers of the register array corresponding to different pipeline cycles, and the PHV is sent out of the current reconfigurable processor after processing is completed.

13. The programmable data plane chip according to claim 11, wherein when the reconfigurable processor is reconfigured as the RTC processor:
   the PHV of a packet is received by a current reconfigurable processor and is written into the data memory of the current reconfigurable processor, the current reconfigurable processor is notified to start executing a processing flow, the current reconfigurable processor reads an instruction to be executed from an instruction memory based on a program counter until a processing termination instruction is read; and
   each read instruction is parsed by a dedicated decoder and is dispatched to the ALU or the SALU, wherein the ALU reads a field involved in calculation from the register array or a parameter of the instruction, performs the calculation and writes back a calculation result into the register array; and the SALU reads a field involved in calculation from the register array or a parameter of the instruction and reads data involved in the calculation from the data memory, performs the calculation and writes back a calculation result into the register array and/or the data memory; wherein
   the matching module is connected to or not connected to the current reconfigurable processor, wherein when the matching module is connected to the current reconfigurable processor, the current reconfigurable processor supports matching instruction, data required by the instruction is extracted from the register array and submitted to the matching module, and the matching module writes back a matching result into the register array.

14. The programmable data plane chip according to claim 10, wherein the reconfigurable processor is reconfigurable as an RTC processor having a plurality of RTC cores, and a quantity of the RTC cores is determined based on parallelism of the pipeline stage when the reconfigurable processor is reconfigured as the pipeline stage.

15. The programmable data plane chip according to claim 10, wherein the reconfigurable processor-based programmable switching fabric further comprises: a parser, a payload buffer, a deparser, and a hardware load, wherein
   the parser and the deparser are connected to the first side pathway,
   the payload buffer and the hardware load are connected to the second side pathway, and
   the parser is connected to the payload buffer and is configured to parse a packet to obtain the PHV and a payload and send the payload to the payload buffer.

16. The programmable data plane chip according to claim 15, wherein the first side pathway comprises a plurality of first-pathway nodes, and in the first side pathway, the PHV passes through a processing flow of the complete pipeline and is sent by a last reconfigurable processor in the pipeline reconfigured as the pipeline stage to a corresponding first-pathway node, wherein:

the PHV not to be sent to the RTC processor for processing is transferred along a first path that starts from the first-pathway node corresponding to the last reconfigurable processor in the pipeline that is reconfigured as the pipeline stage, and directly reaches a first-pathway node corresponding to the deparser along the first side pathway;

the PHV to be sent to the RTC processor for further processing is transmitted along a second path that starts from the first-pathway node corresponding to the last reconfigurable processor in the pipeline that is reconfigured as the pipeline stage, and passes through a first-pathway node corresponding to the RTC processor at which an RTC core assigned for processing the PHV is located along the first side pathway, wherein the PHV is downloaded from the first-pathway node corresponding to the RTC processor to the RTC core assigned for the PHV for processing, and is uploaded to the first-pathway node corresponding to the RTC processor at which the RTC core that processes the PHV is located in an idle cycle of the first-pathway node.

17. The programmable data plane chip according to claim 16, wherein the first path and the second path have a common source node and a common sink node, wherein the source node is the first-pathway node corresponding to the last reconfigurable processor reconfigured as the pipeline stage, the sink node is a first-pathway node corresponding to the deparser, and a buffer is provided at the sink node for handling congestion, wherein when the buffer meets an impending overflow condition, the buffer sends a notification signal to the reconfigurable processor reconfigured as the RTC processor, to cause the reconfigurable processor to stop uploading a new PHV to the second path.

18. The programmable data plane chip according to claim 15, wherein the second side pathway comprises at least one second-pathway node, the second side pathway supports at least one of following data transfer:

sending a request from the reconfigurable processor reconfigured as the RTC processor, reading a payload of a packet processed by the reconfigurable processor reconfigured as the RTC processor from the payload buffer, and transferring the payload back to the reconfigurable processor reconfigured as the RTC processor, wherein the payload is stored in the data memory by the reconfigurable processor reconfigured as the RTC processor for subsequent processing;

sending a request from the reconfigurable processor reconfigured as the RTC processor, reading data in the data memory or the register array of another reconfigurable processor, and transferring the read data back to the data memory of the reconfigurable processor reconfigured as the RTC processor;

sending a request from the reconfigurable processor reconfigured as the RTC processor, and writing data into the data memory or the register array of another reconfigurable processor; and sending a request from the reconfigurable processor reconfigured as the RTC processor, and sending data to a hardware load, wherein the hardware load sends a processing result back to the reconfigurable processor reconfigured as the RTC processor.

* * * * *